(12) United States Patent
Gregg et al.

(10) Patent No.: US 10,925,348 B2
(45) Date of Patent: Feb. 23, 2021

(54) HEAT SHIELD SHOE DEVICE

(71) Applicants: Leanne Gregg, Newport, TN (US); Russell Bryan Gregg, Newport, TN (US)

(72) Inventors: Leanne Gregg, Newport, TN (US); Russell Bryan Gregg, Newport, TN (US)

(*) Notice: Subject to any disclaimer, the term of this patent is extended or adjusted under 35 U.S.C. 154(b) by 153 days.

(21) Appl. No.: 16/054,371

(22) Filed: Aug. 3, 2018

(65) Prior Publication Data
US 2020/0037706 A1 Feb. 6, 2020

(51) Int. Cl.
| A43B 17/14 | (2006.01) |
| A43B 17/00 | (2006.01) |
| A43B 7/14 | (2006.01) |
| B32B 7/12 | (2006.01) |
| B32B 9/02 | (2006.01) |
| B32B 27/34 | (2006.01) |
| A43B 5/00 | (2006.01) |

(52) U.S. Cl.
CPC ............ *A43B 17/006* (2013.01); *A43B 7/149* (2013.01); *A43B 17/14* (2013.01); *B32B 7/12* (2013.01); *B32B 9/02* (2013.01); *B32B 27/34* (2013.01); *A43B 5/00* (2013.01); *B32B 2250/03* (2013.01); *B32B 2437/02* (2013.01)

(58) Field of Classification Search
CPC ....... A43B 17/006; A43B 13/20; A43B 13/14; A61F 5/14
USPC ...................................... 36/3 A, 44, 28, 141
See application file for complete search history.

(56) References Cited

U.S. PATENT DOCUMENTS

| 4,078,321 A | 3/1978 | Famolare |
| 4,571,853 A | 2/1986 | Medrano |
| 5,381,607 A * | 1/1995 | Sussmann ............ A43B 13/181 36/28 |
| 5,543,194 A * | 8/1996 | Rudy ................... A43B 17/026 428/69 |
| 5,845,418 A | 12/1998 | Chi |
| 5,926,977 A * | 7/1999 | Sanders ............... A43B 3/0026 36/7.1 R |
| 7,918,041 B2 | 4/2011 | Cho |
| 8,307,568 B2 * | 11/2012 | Bell ......................... A43B 7/34 36/4 |
| 9,480,298 B2 * | 11/2016 | Barnes ................... A43B 7/144 |
| 9,839,259 B2 | 12/2017 | Arquilla |
| 2005/0000116 A1 * | 1/2005 | Snow ................... A43B 13/186 36/28 |
| 2009/0090024 A1 * | 4/2009 | Phlawadana ......... A43B 3/0026 36/1.5 |
| 2016/0000184 A1 | 1/2016 | Guadalajara |

FOREIGN PATENT DOCUMENTS

| EP | 2918185 B1 | 9/2017 |
| EP | 2838394 B1 | 11/2017 |

\* cited by examiner

*Primary Examiner* — Timothy K Trieu
(74) *Attorney, Agent, or Firm* — Pitts & Lake, P.C.

(57) ABSTRACT

An insulating shoe insert including a core layer formed of a cellular material, and a top layer and a bottom layer bonded to opposing sides of the core layer, respectively, the top layer and the bottom layer being configured as thin sheets of aromatic polyamide material such that the top layer and bottom layer cooperate with the core layer to create a heat transfer resistance sufficient to resist transfer of heat through the core layer.

7 Claims, 2 Drawing Sheets

HEAT SHIELD SHOE DEVICE

BACKGROUND

1. Field of the Invention

The present general inventive concept relates to footwear, and in particular to an integrated or insertable device for use in footwear to inhibit heating of a person's foot within the shoe when the sole of the shoe is exposed to excessive heat.

2. Description of Related Art

It is known to provide athletic shoes and other footwear items with cooling devices or venting to prevent overheating of a user's foot. Improvements in providing footwear configured to shield a person's foot from excessive heat are desired.

Among the devices known in the art, for example, U.S. Pat. No. 5,845,418, issued to Kuan-Min Chi, discloses a ventilation insole which includes a bottom air chamber layer and a smooth top cover layer covered over the bottom air chamber layer, the bottom air chamber layer having a plurality of intersected ribs, a plurality of recessed air chambers respectively separated from one another by the intersected ribs and closed by said top cover layer and a plurality of air vents at intersected points of the intersected ribs, the smooth top cover layer having a plurality of air vents respectively disposed in communication with the air vents of the bottom air chamber layer.

U.S. Pat. No. 7,918,041, issued to Cho, discloses an article of footwear including a cooling system. The article of footwear includes a sole system. The sole system includes a first compression chamber and a second compression chamber, each configured to compress during motion. The compression of the first compression chamber and the second compression chamber creates a pressure imbalance that facilitates the exchange of air throughout the article of footwear by means of apertures disposed along the upper sole portion, and channels configured to transfer air to the apertures.

U.S. Pat. No. 9,839,259, issued to Arquilla, discloses a shoe insert liner or no-show sock configured to detachably adhere to an interior cavity of a shoe. In one embodiment, the shoe insert liner includes a liner having an exterior surface and an adhesive bonded to at least a portion of the exterior surface of the liner. The liner includes a longitudinal portion, opposing first and second lateral portions extending in a first direction from opposite sides of the longitudinal portion, and opposing front and rear portions extending in the first direction from opposite ends of the longitudinal portion. Together, the longitudinal, lateral, front, and rear portions of the liner define an interior cavity and an opening configured to receive a user's foot.

Many prior art insulating shoe inserts are bulky and uncomfortable to use with certain types of athletic shoes, or with certain types of athletic equipment, such as cleats. There is a desire for an insulating shoe insert that is thin, not bulky, comfortable to use, and can provide thermal protection for a user's feat on a variety of surfaces such as turf.

SUMMARY

Embodiments of the present general inventive concept provide a simple and efficient insulating shoe insert configured to shield at user's foot from excessive heat emanating from the sole of the shoe. The insulating shoe insert can be separate from and insertable into a shoe or it can be integrally formed within the sole of the shoe.

An insulating shoe insert, as for use in an athletic shoe, comprises a core layer to cushion and to resist moisture, comprising a honeycomb-like cellular material, and a top layer and a bottom layer positioned on opposing sides of the core layer, the top layer and bottom layer to resist the transfer of heat through the insulating shoe insert. The top layer and bottom layer comprise an aromatic polyamide, in some embodiments a long-chain synthetic polyamide in which at least 85% of the amide linkages are attached directly to two aromatic rings, in some specific embodiments NOMEX or a similar meta amarid material. The core layer generally includes a honeycomb-like cellular material with irregularly shaped and spaced cells, often a vegetable-based honeycomb-like cellular material. The top layer and bottom layer are bonded to the core layer by an adhesive.

In one aspect the present general inventive concept provides an insulating shoe insert comprising a core layer to cushion and to resist moisture, comprising a honeycomb-like cellular material, and a top layer and a bottom layer positioned on opposing sides of said core layer, said top layer and bottom layer to resist the transfer of heat through the insulating shoe insert, said top layer and bottom layer comprising an aromatic polyamide, said top layer and bottom layer bonded to said core layer by an adhesive.

In another aspect of the present general inventive concept, the top layer and the bottom layer comprise a long-chain synthetic polyamide in which at least 85% of the amide linkages are attached directly to two aromatic rings.

In another aspect of the present general inventive concept, said top layer and said bottom layer comprise at least one meta amarid material.

In another aspect of the present general inventive concept, said top layer and said bottom layer comprise NOMEX.

In another aspect of the present general inventive concept, said core layer includes a honeycomb-like cellular material with irregularly shaped and spaced cells.

In another aspect of the present general inventive concept, said core layer includes a vegetable-based honeycomb-like cellular material.

In another aspect of the present general inventive concept, said core layer includes a vegetable-based honeycomb-like cellular material that is approximately by weight 45% suberin, 27% lignin, 12% polysaccharides, 6% ceroids, and 6% tannins.

In another aspect of the present general inventive concept, said core layer includes a cork material.

In another aspect of the present general inventive concept, said insulating shoe insert is integrally incorporated into a shoe.

In another aspect the present general inventive concept provides a laminar insulating shoe insert for athletic shoes, comprising a core layer to cushion and to resist moisture, comprising a honeycomb-like cellular material, a top layer and a bottom layer positioned on opposing sides of said core layer, said top layer and bottom layer to resist the transfer of heat through the insulating shoe insert, said top layer and bottom layer comprising an aromatic polyamide; and an adhesive binding said top layer and said bottom layer to said core layer.

In another aspect of the present general inventive concept, the top layer and the bottom layer comprise a long-chain synthetic polyamide in which at least 85% of the amide linkages are attached directly to two aromatic rings.

In another aspect of the present general inventive concept, said top layer and said bottom layer comprise at least one meta amarid material.

In another aspect of the present general inventive concept, said top layer and said bottom layer comprise NOMEX.

In another aspect of the present general inventive concept, said core layer includes a honeycomb-like cellular material with irregularly shaped and spaced cells.

In another aspect of the present general inventive concept, said core layer includes a vegetable-based honeycomb-like cellular material.

In another aspect of the present general inventive concept, said core layer includes a vegetable-based honeycomb-like cellular material that is approximately by weight 45% suberin, 27% lignin, 12% polysaccharides, 6% ceroids, and 6% tannins.

In another aspect of the present general inventive concept, said core layer includes a cork material.

In another aspect of the present general inventive concept, said insulating shoe insert is integrally incorporated into a shoe.

In another aspect of the present general inventive concept, a method of producing an insulating shoe insert comprises providing a core layer to cushion and to resist moisture, said core layer comprising a honeycomb-like cellular material; positioning a bottom layer on one side of said core layer, said bottom layer to resist the transfer of heat through the insulating shoe insert, said bottom layer comprising an aromatic polyamide; positioning a top layer on the side of said core layer opposite said bottom layer, said top layer to resist the transfer of heat through the insulating shoe insert, said top layer comprising an aromatic polyamide; adhering said top layer and said bottom layer to said core layer with an adhesive to form a laminate body; pressing said laminate body in a heat press; and cutting said laminate body in the shape of a shoe insert.

Additional features and embodiments of the present general inventive concept will be set forth in part in the description which follows and, in part, will be obvious from the description, or may be learned by practice of the present general inventive concept.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. The components in the figures are not necessarily to scale, emphasis instead being placed upon illustrating the principles of the invention. A wide variety of additional embodiments will be more readily understood and appreciated through the following detailed description of the example embodiments, with reference to the accompanying drawings in which.

DETAILED DESCRIPTION

Figure 1:
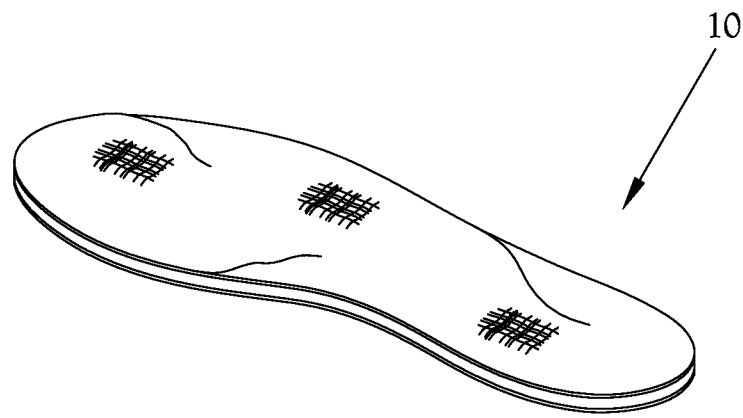
FIG. 1 represents a perspective view of an insulating shoe insert according to one example embodiment of the present general inventive concept.
Figure 2:
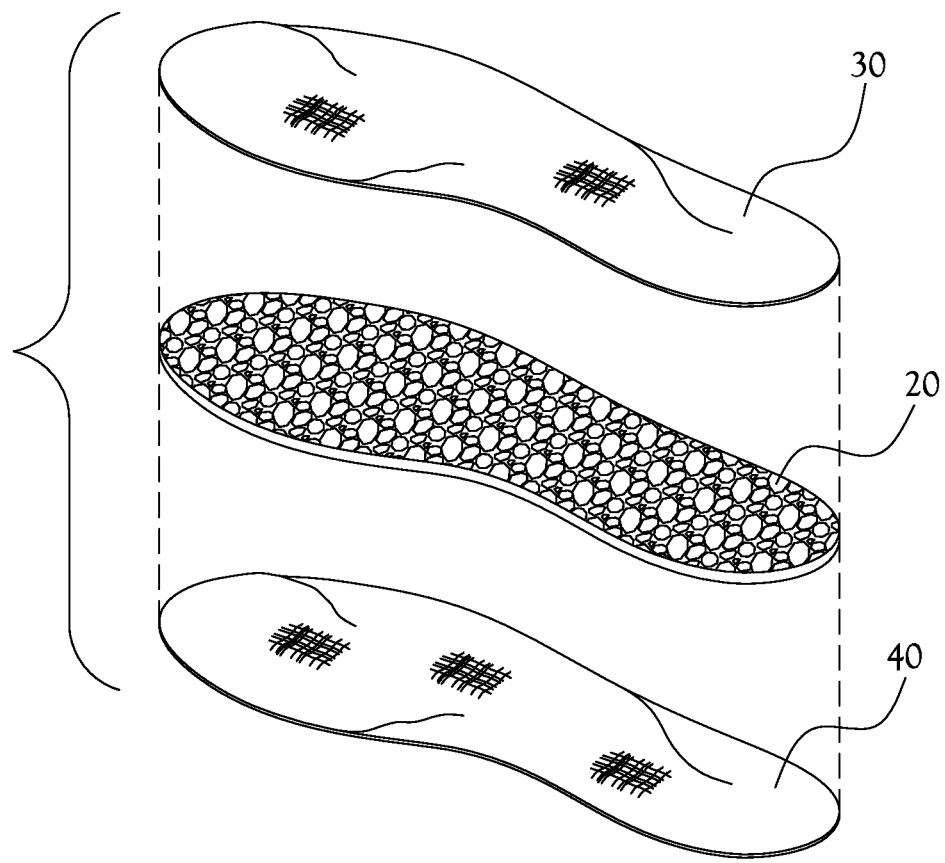
FIG. 2 represents an exploded perspective of the insulating shoe insert shown in FIG. 1.

Turning to the Figures, FIG. 1 shows generally a perspective view of an insulating shoe insert 10 according to one example embodiment of the present general inventive concept. FIG. 2 represents an exploded view of the same insulating shoe insert shown in FIG. 1, illustrating that the insulating shoe insert 10 comprises three layers, including a core layer 20 to cushion and to resist moisture, with a top layer 30 and a bottom layer 40 to provide thermal insulation, the top layer 30 and bottom layer 40 being positioned on either side of the core layer 20 and collectively covering a substantial majority of the surface area of the core layer 20.

Figure 3:
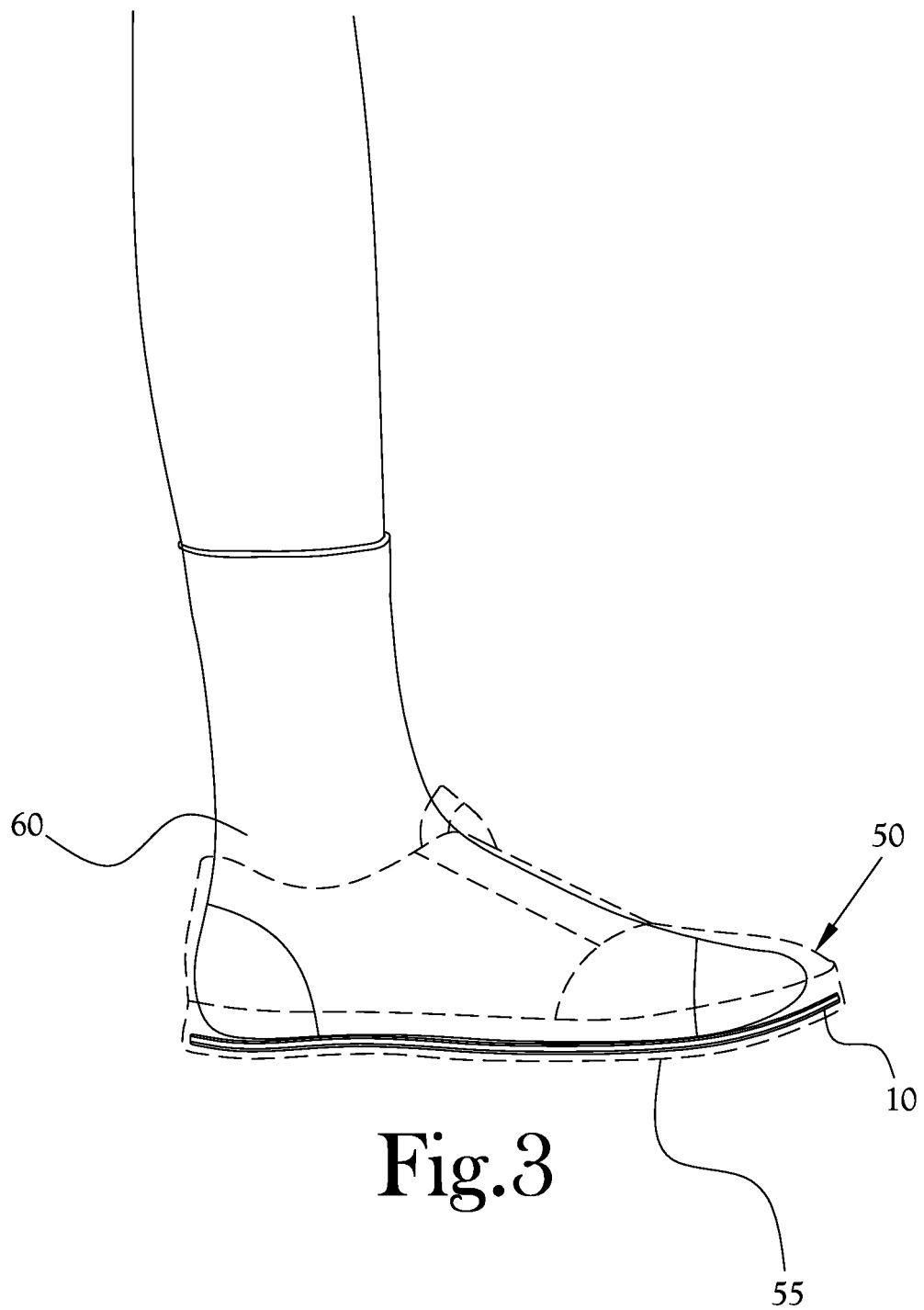
FIG. 3 represents a sidereal view of the insulating shoe insert in use within a shoe.

FIG. 3 illustrates again the example embodiment insulating shoe insert 10 shown in FIGS. 1 and 2, showing the insulating shoe insert 10 in use. As shown in FIG. 3, the insulating shoe insert 10 is positioned within a shoe 50 (such as an athletic shoe) between the sole 55 of the shoe 50 and the foot 60 of a user. The insulating shoe insert 10 may be used with or without a sock.

Generally, the core layer 20 comprises a cushioning and moisture-resistant honeycomb-like cellular material, such as a form of cork or similar material. The core honeycomb-like material can be configured as irregularly shaped and spaced cells having an average of 14 sides, providing effective insulation, cushioning, and resilient properties resistant to moisture absorption.

The core layer 20 can be configured of a generally vegetable-based (or vegetable-derived). In one specific example embodiment, the core layer comprises a vegetable-based honeycomb-like cellular material that is approximately by weight 45% suberin, 27% lignin, 12% polysaccharides, 6% ceroids, and 6% tannins. In use, the core layer 20 helps to cushion the user's foot within the shoe and helps to inhibit the absorption of moisture by the insulating shoe insert 10; inhibiting the absorption of moisture both enhances the thermal insulating properties of the shoe insert 10 (since moisture helps convey heat) and helps to keep the foot comfortable during activity. In various embodiments, the core layer 20 is generally between 1.5 mm and 2.0 mm thick.

Generally, the top layer 30 and bottom layer 40 comprise an aromatic polyamide material that exhibits useful properties of thermal resistance. In several embodiments, the polyamide material employed comprises a fiber-forming long-chain synthetic polyamide in which at least 85% of the amide linkages are attached directly to two aromatic rings. In some embodiments, aromatic polyamide material is a meta aramid, and in some specific embodiments, NOMEX, manufactured by DuPont, is employed. In various embodiments, the top layer 30 and the bottom layer are generally each between 0.25 mm and 0.80 mm thick. Chemical bonding between the layers can be in a zig-zag configuration, resulting in a low tensile and modulus fiber. The materials also cooperate to provide improved abrasion, UV, flame, acid, alkali, and organic solvent resistance.

The top layer 30 and bottom layer 40 generally are bonded to the core layer 20 with an adhesive. Various known adhesives can be used to bond the top and bottom layers to the core layer.

One example method of producing an insulating shoe insert according to the present general inventive concept comprises providing a core layer configured to cushion and to resist moisture, said core layer comprising a honeycomb-like cellular material; positioning a bottom layer on one side of said core layer, said bottom layer being configured to resist the transfer of heat through the insulating shoe insert, said bottom layer comprising an aromatic polyamide; positioning a top layer on the side of said core layer opposite said bottom layer, said top layer to resist the transfer of heat through the insulating shoe insert, said top layer comprising an aromatic polyamide; adhering said top layer and said bottom layer to said core layer with an adhesive to form a laminate body; pressing said laminate body in a heat press; and cutting said laminate body in the shape of a shoe insert.

In testing, an example embodiment insulating shoe insert with a cork core layer, NOMEX top layer, and NOMEX bottom layer demonstrated results of providing a surface that was 28 degrees Fahrenheit cooler than the surrounding turf (129 F. on the top surface of the insulating shoe insert compared to 157 F. for the turf upon which the insulating shoe insert was resting), an unexpectedly large cooling effect from this combination of materials, thereby showing that combination and interaction between the layers yields significantly improved insulation and heat shield properties, including an improved degree of heat resistance, not present in the prior art, including demonstrating a twenty-plus degree reduction in temperature transfer, as well as reduced pain, discomfort, and blisters on the feet.

An insulating shoe insert according to the present general inventive concept provides a number of advantages. The combination of the insulating or thermally resistant properties of the aromatic polyamide layers with the cushioning and moisture-resistant properties of the core layer cooperate to provide a superior shoe insert that keeps the foot cool and comfortable. Aromatic polyamide materials show great compatibility with the honeycomb-like cellular material of the core layer 20 and, unlike some other materials such as silicone, do not show fraying around the edges. Aromatic polyamide materials, unlike some other materials that have been used for shoe inserts, also do not become too slick for effective use in an athletic shoe. The materials used in the example embodiments discussed above allow for the insulating shoe insert to be thin enough that it is not too bulky for effective use with cleats or other athletic gear, including orthotic insoles that can be combined and/or mated with the present inventive concept. A laminar body according to the present general inventive concept provides an insulating shoe insert that is thin, not bulky, comfortable to use, and can provide thermal protection for a user's feet on a variety of surfaces such as artificial turf. In various embodiments, the insulating shoe insert can be separate from and insertable into a shoe, or it can be integrally formed within the sole or base padding of the shoe itself. Those of skill in the art will recognize that a variety of configurations are compatible with the example embodiments described herein and are encompassed by the present general inventive concept.

While various aspects of the invention are described, it will be apparent to those of ordinary skill in the art that other embodiments and implementations are possible within the scope of the invention. Embodiments of the present general inventive concept can be applied to footwear in a variety of fields in addition to sports, such as military, construction, roofers, pavers, beach-ware, etc. Accordingly, the scope of the invention is not limited to any particular field of footwear.

The invention claimed is:

1. An insulating shoe insert, comprising:
a core layer formed of a cellular material; and
a top layer and a bottom layer bonded to opposing sides of said core layer, respectively,
the top layer and the bottom layer being configured as thin sheets of aromatic polyamide material such that the top layer and bottom layer cooperate with the core layer to create a heat transfer resistance sufficient to resist transfer of heat through the core layer,
wherein the core layer includes a vegetable-based honeycomb-like cellular material that is approximately by weight 45% suberin, 27% lignin, 12% polysaccharides, 6% ceroids, and 6% tannins.

2. The insulating shoe insert of claim 1 wherein the top and bottom layers comprise a long-chain synthetic polyamide.

3. The insulating shoe insert of claim 1 wherein the top and bottom layers comprise at least one meta amarid material.

4. The insulating shoe insert of claim 3 wherein the top and bottom layers comprise nomex material.

5. The insulating shoe insert of claim 1 wherein the core layer includes a honeycomb-like cellular material with irregularly shaped and spaced cells.

6. The insulating shoe insert of claim 1 wherein the core layer includes a cork material.

7. The insulating shoe insert of claim 1 wherein the insulating shoe insert is integrally incorporated into a shoe.

* * * * *